United States Patent
Brogni et al.

(10) Patent No.: US 9,700,981 B2
(45) Date of Patent: Jul. 11, 2017

(54) METHOD OF CUTTING OR MACHINING INTERNAL GEAR TEETH, MOTION-CHANGING DEVICE, AND MACHINE TOOL

(71) Applicant: GLEASON-PFAUTER MASCHINENFABRIK GMBH, Ludwigsburg (DE)

(72) Inventors: Johannes Brogni, Dotzigen (CH); Domenico Petrallia, Bern (CH); Oswald Witschi, Meinisberg (CH)

(73) Assignee: GLEASON-PFAUTER MASCHINENFABRIK GMBH, Ludwigsburg (DE)

( * ) Notice: Subject to any disclaimer, the term of this patent is extended or adjusted under 35 U.S.C. 154(b) by 108 days.

(21) Appl. No.: 14/767,749

(22) PCT Filed: Jan. 27, 2014

(86) PCT No.: PCT/EP2014/000207
§ 371 (c)(1),
(2) Date: Aug. 13, 2015

(87) PCT Pub. No.: WO2014/131487
PCT Pub. Date: Sep. 4, 2014

(65) Prior Publication Data
US 2015/0375352 A1    Dec. 31, 2015

(30) Foreign Application Priority Data
Feb. 26, 2013 (DE) .................. 10 2013 003 288

(51) Int. Cl.
*B23Q 11/00* (2006.01)
*B23F 5/16* (2006.01)
*B23Q 11/08* (2006.01)

(52) U.S. Cl.
CPC .......... *B23Q 11/0042* (2013.01); *B23F 5/163* (2013.01); *B23Q 11/08* (2013.01); *B23Q 11/0057* (2013.01); *Y02P 70/171* (2015.11)

(58) Field of Classification Search
CPC .............. B23Q 11/0042; B23Q 11/005; B23Q 11/0053; B23Q 11/0057; B23Q 11/0075; B23F 5/163; B23F 23/12; Y02P 70/171
See application file for complete search history.

(56) References Cited

U.S. PATENT DOCUMENTS 2,278,300 A * 3/1942 Barter .................... B23F 19/10
29/76.1
2,297,796 A 10/1942 O'Brien
(Continued)

FOREIGN PATENT DOCUMENTS

CH            252841 A    1/1948
CN         201389696 Y    1/2010
(Continued)

OTHER PUBLICATIONS

International Search Report and Written Opinion for PCT/EP2014/000207, ISA/EPO, Jul. 11, 2014, 13 pgs., with English translation (12 pgs.).

*Primary Examiner* — Daniel Howell
*Assistant Examiner* — Yasir Diab
(74) *Attorney, Agent, or Firm* — Robert L. McDowell

(57) ABSTRACT

The invention concerns a method for the chip-removing generation or machining of internal gear teeth on a workpiece which is rotatable about its rotary axis and radially delimits a free space that extends axially to one side beyond the internally toothed region and whose radial width narrows in the direction of its axial extension in at least one location. An externally toothed tool which is driven in rotary movement about its axis of rotation is brought from the opposite side into rolling engagement with the internally toothed (Continued)

region with the rotary axes crossed at an angle. Through the application of a mechanical force, the chips which are produced in the process and which are subject to a centrifugal force are caused to change their movement in the zone of narrowing width in a manner directed against the origin of the centrifugal force.

19 Claims, 3 Drawing Sheets

(56) References Cited

U.S. PATENT DOCUMENTS

| | | | | | |
|---|---|---|---|---|---|
| 2,916,971 | A | * | 12/1959 | McNabb | B23F 17/006 409/31 |
| 4,066,001 | A | * | 1/1978 | Nishijima | B23F 5/163 407/28 |
| 2007/0020058 | A1 | * | 1/2007 | Peiffer | B23F 9/10 409/8 |
| 2008/0131224 | A1 | * | 6/2008 | Vouillamoz | B23G 1/34 409/74 |
| 2012/0155980 | A1 | * | 6/2012 | Ronald | B23F 17/006 409/8 |
| 2013/0034398 | A1 | * | 2/2013 | Petrazzini | B23F 23/006 409/62 |
| 2013/0266391 | A1 | * | 10/2013 | Schweiker | B23F 5/163 409/51 |

FOREIGN PATENT DOCUMENTS

| | | |
|---|---|---|
| DE | 4424452 A1 | 1/1996 |
| DE | 102010051338 A1 | 5/2012 |
| DE | 102011009027 A1 | 7/2012 |
| EP | 0023984 A1 | 2/1981 |
| JP | H11-48078 A | 2/1999 |

* cited by examiner

METHOD OF CUTTING OR MACHINING INTERNAL GEAR TEETH, MOTION-CHANGING DEVICE, AND MACHINE TOOL

The invention concerns a method for the chip-removing generation or machining of internal gear teeth on a workpiece which is rotatable about its rotary axis and radially delimits a free space that extends axially at least to one side beyond the internally toothed region and whose radial width narrows in the direction of its axial extension in at least one location. The invention further concerns a motion-changing device designed to be employed in carrying out the method, as well as a machine tool with the capability to carry out the method.

Internally toothed workpieces of the aforementioned kind are being manufactured for example in the automobile industry as components for automatic transmissions, for example eight- or nine-speed transmissions, and are produced through the process of gear shaping. The narrowing of the radial width of the free space results for example from a recess on the inside of the workpiece behind the internal teeth which serves to accommodate a coupling sleeve.

The invention has the objective to propose a further developed version of a method of the aforementioned kind which is improved in particular from a manufacturing point of view.

From a method-oriented point of view, this task is solved by the invention in essence through the concept that an externally toothed tool that is driven in rotary movement about its axis of rotation is brought into rolling engagement with the internal gear teeth from the opposite side, with the axes crossing each other at an angle different from zero, and that, through the application of a mechanical force, the chips which are produced in the process and which are subject to a centrifugal force are caused to change their movement in the region ahead of the zone of narrowing width in a manner directed against the origin of the centrifugal force.

A method of generating gear teeth through the rolling engagement with an externally toothed tool wherein the axes are crossing each other at an angle is in itself a known process which, although described for example in DE 10 2011 009 027 A1 primarily as a process for externally toothed workpieces, can in principle also be employed to produce internally toothed workpieces of a simple design geometry. One of the chip-cutting machining methods operating under this kinematic concept is the process of skiving with a skiving wheel, which represents a preferred way of practicing the method according to the invention. Within the applicant's organization, the expression "power skiving" is also favored instead of the term "skiving".

The invention is based on the surprising observation that, with the inventive concept of introducing a mechanical force to act on the chips in the region ahead of the location of narrowing width in a manner directed against the origin of the centrifugal force, it is possible to perform a method that is based on the foregoing kinematic principle without any damage to the workpiece or the tool. Due to the very high rate of rotation of the workpiece which (depending on the workpiece diameter and the crossing angle of the axes) can reach more than 600 rpm, preferably more than 1500 rpm, in particular more than 2000 rpm, but not excluding the possibility of speeds up to 3000 rpm or more, for example 3500 rpm, an accumulation of chips within the workpiece ahead of the zone of narrowing width with the result of damage or destruction to the workpiece and/or the tool is unavoidable without the inventive concept of bringing a mechanical force to act on the chips. The centrifugal forces acting on the chips are so strong that the air jets which are used in the manufacture of internally toothed workpieces of a simple design geometry for blowing out the chips from the free space surrounded by the internal gear are no longer effective in removing all of the chips.

With the method of the present invention, this accumulation of chips can in any case be avoided sufficiently, so that the workpiece or the tool will no longer be damaged.

The change of movement occurs preferably in the form of a decrease of the azimuthal velocity component of the chips. As this velocity component is reduced, the centrifugal force is lowered in quadratic proportion. The azimuthal velocity can in particular be reduced by one or more orders of magnitude and in fact be practically lowered to zero.

A further embodiment can entail that the change of movement gives rise to a radially inward directed velocity component of the chips. This causes the chips to move rapidly to a radially more central zone of the free space, whereby the removal of the chips is again facilitated.

In a particularly preferred embodiment, the application of the mechanical force occurs as a result of the chips colliding with a collision partner of greater mass which is not participating in the rotation. Relative to a reference system that is not participating in the rotation, this collision partner represents a stationary barrier for the impinging chips.

The narrowing of the width itself can occur for example in the form of a step. Specifically, the step can be the posterior radially oriented wall of a recess on the workpiece.

With preference, the massive collision partner is positioned radially close to the spatial boundary of the free space and in particular free of any contact with the workpiece. In any case, if no additional function is assigned to the collision partner, the latter should not be able to influence the workpiece and its rotary movement.

It is further preferred that the massive collision partner be positioned axially close to the location of narrowing width, but in particular free of any contact with the workpiece. This increases the reliability that the mechanical force application will fulfill its purpose. If the free space includes a location of increasing width, it is likewise preferred that the collision partner be positioned close to the location of increasing width, but in particular free of any contact with the workpiece. In other words, the collision partner blocks the space that has been created by a recess on the workpiece.

Preferably, the collision partner is held in a position to reach through the free space in the zone of the internal gear teeth, and the holder device is positioned in that zone at a distance from the tool. Accordingly, the space enclosed by the internal gear teeth is occupied by an additional object besides the externally toothed tool which normally takes up one third to two thirds of the available radial width of the free space. The risk of collisions between the object and the tool which exists as a result of this arrangement is reduced by allowing an adequate safe distance between the object and the tool.

It is therefore preferred to bring the workpiece and the tool into operating engagement with each other only after the massive collision partner has arrived in its assigned position.

As a practical measure, a stream of fluid, specifically air, is sent through the free space in the direction in which the latter extends, in particular in horizontal arrangements of the workpiece axis, in order to impart an axial velocity component to the chips.

From an apparatus-oriented point of view, a device for changing the movement of chips produced in a machining process for generating or finishing internal gear teeth of a workpiece is proposed and placed under protection, wherein the device includes a neck portion extending axially to reach through a free space that is radially delimited by the internal gear teeth, a head portion projecting radially at the free end of the neck portion and carrying an impact surface designed for a collision with the chips, and a base portion adjoining the opposite end of the neck portion and designed to couple the motion-changing device to a movable support device which allows a guided movement of the motion-changing device with a first vector component of the movement in the axial direction and a second vector component, independent of the first, in the radial direction.

The neck portion of this device is that part that holds the head portion which represents the actual collision partner and which during the machining process occupies a position in parallel with the tool in the free space enclosed by the internal gear teeth. On the side that faces away from the head portion, the motion-changing device is adjoined by a base portion designed to be coupled to a movable support device which allows the motion-changing device to be moved into the required position.

In a particularly preferred embodiment, the axial dimension of the head portion conforms at least in part to the contour of the radially delimited free space that extends beyond the internally toothed zone of the workpiece. This again increases the reliability that the mechanical force application will fulfill its purpose.

The impact surface of the head portion could in principle be oriented radially. However, the invention also includes the case where the impact surface is at least in part inclined relative to the radial direction and thus acts as a ramp for the chips.

The azimuthal dimension of the head portion is likewise limited only by the spatial requirements for the tool. In principle, due to the high rpm rates of the workpiece, a small angular width, i.e. an azimuthal dimension of the head portion in the same order of magnitude as the radial dimension, is sufficient. However, the head portion can extend in the azimuthal direction over a larger angle such as 30° or more, even 60° or more, in particular 90° or more, or even 120° or more. Furthermore, the head portion could also be configured as a plurality of parts. In other words, there could be several head portions azimuthally separated from each other.

In a particularly preferred embodiment, the head portion is removable and in particular exchangeable. This would allow the motion-changing device to be adapted to a production lot of different workpieces without disconnecting the base portion.

The invention further provides a set of motion-changing devices whose respective head portions differ from each other in their axial dimension and the size of their radial projection. This makes it possible to provide a suitable motion-changing device for each different production lot of workpieces which may differ from other lots in the way the respective free space is geometrically delimited, so that an optimized mechanical force application can be achieved in each case.

Furthermore, from an apparatus-oriented point of view, a machine tool is proposed and placed under protection. This is a machine tool for generating or finishing internal gear teeth on a workpiece that can be driven in rotary movement about its axis of rotation, using an externally toothed tool that can be driven in rotary movement about its axis of rotation and is designed for rolling engagement with the internal gear teeth with the axes crossing each other at an angle, wherein the machine tool has a workpiece spindle onto which the internally toothed workpiece can be clamped, a tool spindle onto which the tool can be clamped, a first linear displacement axis along which the relative position between the workpiece spindle and the tool spindle can be changed with a directional component running parallel to the rotary axis of the workpiece, a second linear displacement axis along which the distance between the rotary axis of the workpiece and the rotary axis of the tool can be changed, and a rotary axis relative to which the crossing angle between the respective rotary axes of the workpiece and the tool can be changed. The machine tool is distinguished essentially by a movable support device by means of which a device according to one of the configurations described above can be moved with a first vector component of the movement parallel to the first linear displacement axis and in particular with a second vector component that is independent of, and orthogonal to, the first vector component.

The advantages of the machine tool according to the invention are a consequence of the advantages of the inventive method, wherein the machine tool is designed to have the movement axes required for the positioning of the motion-changing device that forms the collision partner.

Further within the scope of the invention, the machine tool includes a control device which is designed to control the machine tool in executing the method according to one of the method-oriented aspects described above.

Further advantages, distinguishing features and details of the invention will become evident from the following description which refers to the attached drawings, wherein FIG. 1 represents a perspective view including the axes of motion of a machine tool;

Figure 1:
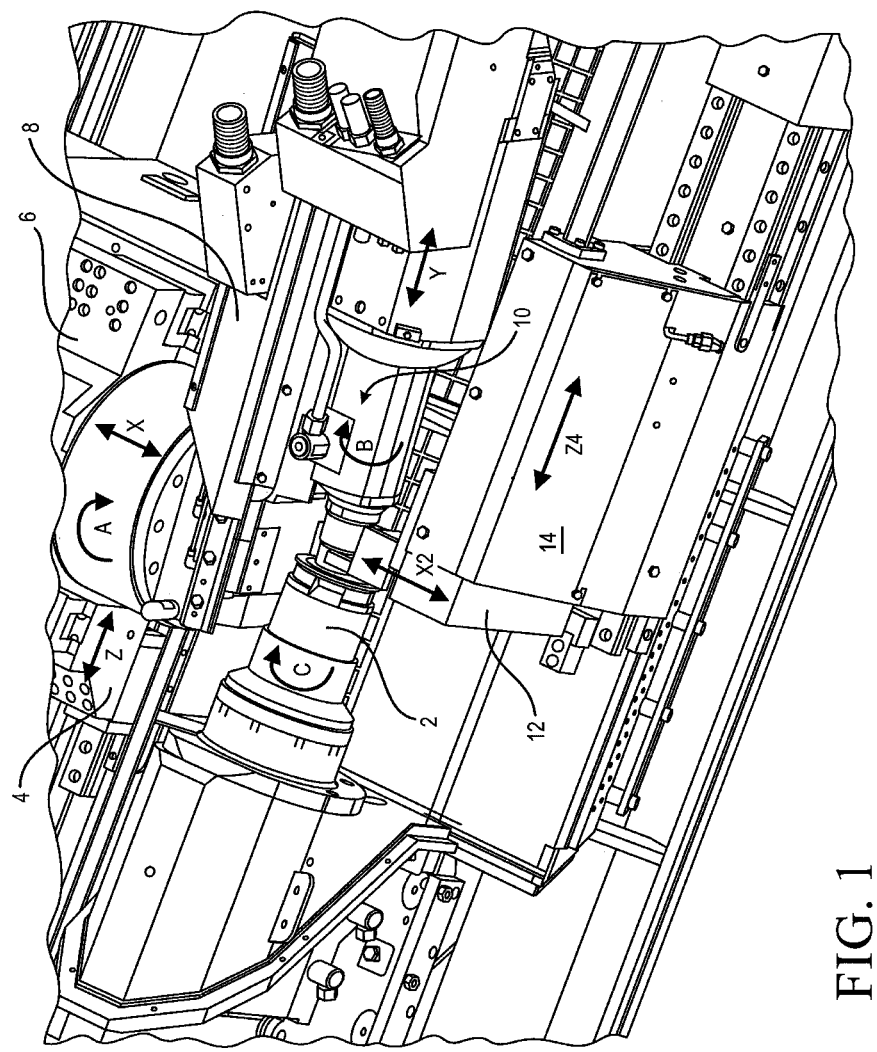

In a perspective view from above, FIG. 1 shows a portion of a machine tool wherein the axes of motion of the machine are indicated. The machine tool 100 is designed for the machining of a workpiece, wherein the generation of gear teeth on the workpiece occurs by way of a cutting engagement between the tool and the workpiece in which the respective rotary axes of the workpiece and the tool cross each other at an angle. The machine in the illustrated example is used for the skiving of internal gear teeth and is referred to as a skiving machine.

The skiving machine 100 has a workpiece spindle 2 that is rotatably supported in a fixed position on the machine bed of the skiving machine, with the rotary axis for the rotation of the workpiece being identified as C. Associated with the tool is a horizontal carriage 4 which is movable relative to the machine bed along a linear displacement axis Z that runs parallel to the axis of the workpiece spindle.

The horizontal carriage 4 carries a further horizontal carriage 6 which is movable along a second linear displacement axis X that runs orthogonal to the linear displacement axis Z of the carriage 4. The carriages 4 and 6 thus form a cross-slide arrangement.

A further linear carriage 8 which holds the tool spindle 10 is arranged with the ability to swivel about a rotary axis A that runs parallel to the second linear displacement axis X. The linear displacement axis Y of the swivelable carriage 8 is thus determined by the swivel position of the rotary movement about A. The tool rotates about the axis B which runs parallel to the linear displacement axis Y. Thus, with the capability to swivel about the axis A, the crossing angle of the axes is set for the generating and machining of the internal gear teeth of the workpiece.

In the illustrated example, direct drives are provided for the respective rotations C of the workpiece spindle and B of the tool spindle. In accordance with common practice, the movements along X, Y, Z and about A, B, C are performed under computerized numerical control (CNC). The configuration of the machine tool as described up to this point belongs to the known state of the art. In addition to the skiving of internal or external gear teeth, the machine is further suitable for hard-finishing operations in which the axes are crossed at an angle, and also for shaving operations (soft shaving).

However, the skiving machine 100 includes a further motion device relative to the plane that is defined by the respective axes C and B of the workpiece spindle and the tool spindle opposite the tool carriage arrangement 4, 6, 8. This further motion device is realized as a cross-slide arrangement 12, 14 with a carriage 14 movably constrained on the machine bed along the fourth linear displacement axis Z4 which runs parallel to the first linear displacement axis Z. The horizontal carriage 14, in turn, carries a further horizontal carriage 12, whose linear displacement axis X2 runs parallel to the second linear displacement axis X as a fifth linear displacement axis of the skiving machine 100. Although not strictly required, the parallelism of the axes Z4 and Z as well as of X2 and X is advantageous. In this embodiment, it is of importance that one of the carriages 12, 14 can perform a movement with a vector component parallel to the first linear displacement axis Z, while the other of the carriages 12, 14 can perform a movement with a vector component in the direction of the second linear displacement axis X. The drive mechanisms of the carriages 12 and 14 are likewise running under the CNC control of the skiving machine 100.

Figure 2:
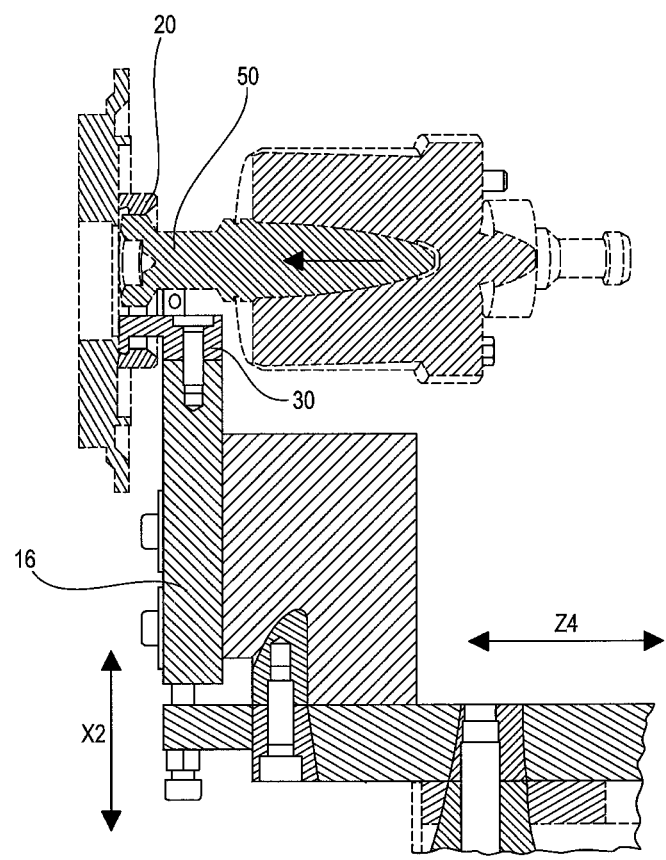
FIG. 2 represents a horizontal section of a portion of the machine tool of FIG. 1.

As can be seen more clearly in FIG. 2, the carriage 12 which is movable along the axis X2 has an arm 16 extending radially, i.e. in the direction X2, which reaches out towards the tool 50 which is clamped to the tool spindle. The arm 16 in this arrangement is given a sufficiently small axial dimension so that, in the position shown in FIG. 2, no contact occurs between the tool or the tool spindle and the arm 16.

Releasably attached to the arm 16 is a motion-changing device whose design and function are described in the following with the help of the enlarged representations of FIGS. 3 and 4.

Figure 3:
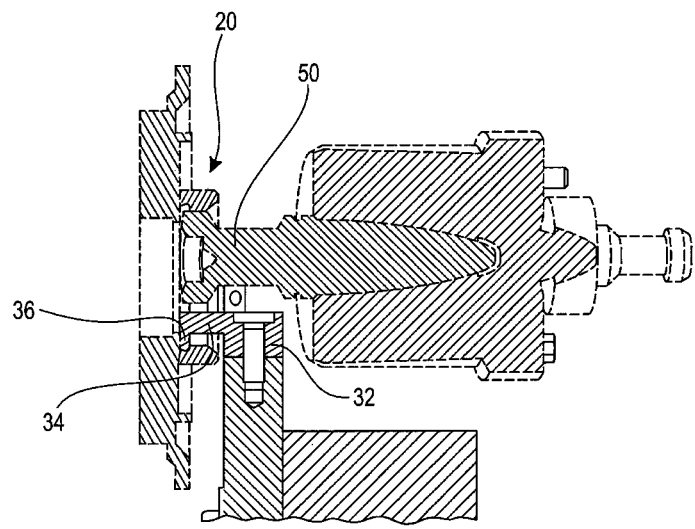
FIG. 3 represents an enlarged detail of FIG. 2.
Figure 4:
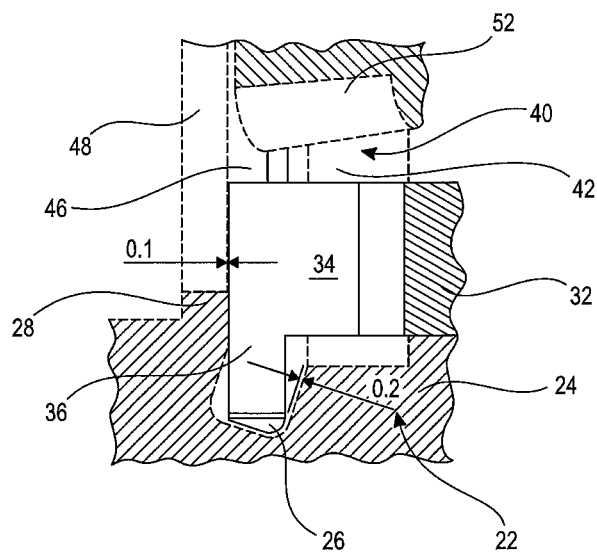
FIG. 4 represents a further enlarged portion of FIG. 3.

In FIGS. 3 and 4, the workpiece on which internal gear teeth are being formed is identified by the reference symbol 20. Of the internal gearing 22 of the workpiece 20, the reference symbol 24 identifies the tooth which lies in the axial section plane which forms the drawing plane of FIG. 4. Shown in FIGS. 2 to 4 to the left of the internal gearing 22 and immediately adjacent to the latter, a recess 26 is formed on the workpiece 20, so that the space 40 that is radially enclosed by the workpiece extends radially at this location. At the posterior border of the recess 26, the workpiece 20 accordingly has a ring-shaped wall 28, as a result of which the space 40 has a complementary narrowing taper. Of the space 40 enclosed by the workpiece, the diameter of the space portion 48 in that area is thus smaller than the diameter of the space portion 46 which lies axially between the space portion 48 and the space portion 42 that is delimited by the internal gear.

As may be seen in FIG. 2, the arm 16 carries a releasably attached device which, based on its function, is referred to in the following as chip stopper 30. The chip stopper 30 has a base portion 32 with a hole through which the chip stopper is connected to the arm 16 by way of a fastener means such as a screw. Adjacent to the base portion 32, a neck portion 34 of the chip stopper extends in axial direction through the portion 42 of the space 40 in which the external gear teeth 52 of the skiving tool 50 are located. Thus, during the machining, the operating tool 50 as well as the chip stopper 30 are simultaneously present in the space 42 that is enclosed by the internal gear 22.

Arranged at the free end of the neck portion 34 is the head portion 36 of the chip stopper 30 which protrudes radially outward and thus reaches into the recess 26 of the workpiece 20, as may be seen more clearly in FIG. 4. In the illustrated case, the head portion 36 of the chip stopper 30 closes off the recess 26 and changes at this location the space portion 46 from an otherwise available free space into a blocked space.

Following is a description of the function of the chip stopper 30:

Before the tool 50 is brought into the position shown in FIG. 3 relative to the workpiece 20, as called for by the machining process that is to be performed, the chip stopper 30 is brought into the position shown in FIG. 3 by moving the carriages 14 and 12 along the displacement axes Z4 and X2 while the tool 50 is still in its retracted position. The movement along the axis Z4 takes place with the carriage 12 dislocated radially from the position shown in FIG. 3 in the direction towards the workpiece axes. Only after the head portion 36 has reached a position directly facing the recess 26 is the carriage 12 moved radially outward until the head portion 36 closes the recess 26 against the ring-shaped wall 28.

After the chip stopper 30 has thus been moved into position, or in any case after a sufficient remaining free space is available to move the externally toothed tool 50 into place subsequent to the positioning of the chip stopper in the free space 40, the tool 50 is brought into operating engagement with the workpiece 20 as in the conventional skiving process by rotating the workpiece and the tool through controlled movements relative to the available axes in order to generate the internally toothed gear 22.

Without the chip stopper 30, a part of the chips produced in the machining process would not be removed from the free space 40 by the compressed air jet (not shown in the drawing) which is provided to blow out the chips through the space portion 48, but would end up in the recess 26 and no longer clear the wall 28 as they are subjected to a high rotational velocity and resultant centrifugal force due to the high rpm-rate of the workpiece. The chips accumulating in the recess 26 would eventually reach the operating zone of the tool 50, and as a consequence, the currently generated workpiece as well as the tool would be damaged or even destroyed. This is also the reason why workpieces with the tapered-down free space could previously not be produced by skiving.

However, as a result of the chip stopper 30 being moved into position parallel to the workpiece, the head portion 36 blocks the recess 26 at the corresponding azimuthal location. This has the consequence that any chips which may accumulate in the recess 26 will collide with the chip stopper 30 so that their azimuthal velocity will be reduced significantly in comparison to their previous fast velocity, even to a near-zero level after the impact surface has been formed, as the chip masses are orders of magnitude smaller than the mass of the chip stopper. As a result, the centrifugal force acting on the chips is effectively reduced to zero, and the chips are likewise moved out of the free space 40 by the action of the compressed air that is being used.

The impact surface of the head portion 36, although not shown in the drawing, can be inclined relative to the radial direction in such a way that the radially inner portion recedes azimuthally in the direction of the workpiece rotation. The impact surface therefore does not have to be a planar surface, but could also be curved. Due to this inclined orientation, the collision with the impact surface imparts a radially inward directed velocity component on the chips, so that they are more rapidly and effectively caught by the compressed air stream and are able to leave the space 40. However, the chip stopper 30 proves to be effective even independently of the exact configuration of the impact surface.

With the proposed chip stopper, the field of application for the skiving process is thus expanded to workpieces with internal gear teeth of the aforementioned configuration.

Furthermore, with a suitable selection of shape and material, the chip stopper 30 can also serve additional functions such as for example the deburring of the posterior tooth edges. It can also be employed as a turning tool, in particular for generating a contour of the workpiece that lies behind the internal gear teeth, for example even the recess 26 itself. Thus, the recess 26 and the internal gear 22 could for example be generated as parallel operations at the same time, whereby the total machining time for the manufacturing of the workpiece is significantly reduced. In regard to deburring, one has the possibility to generate the internal gear 22 as described above and to subsequently use the chip stopper 30 which is designed to also serve as a deburrer to remove material that stands out axially at the edges (retracting the tool 50 during this work phase, if necessary). Possibly, the skiving tool 50 could be retracted in order to provide more space for a radial movement (directed along X2) of the deburring chip stopper 30. After the deburring, the skiving tool could be moved once more along the tooth flanks in a finishing pass, in order to remove residual material protruding in azimuthal direction in the area of the tooth edges as a result of the deburring.

The invention is not limited to the constructively realized embodiments which have been described with the help of the illustrated example. Rather, the features set forth in the description and in the claims, used individually or in combination, can be essential for the realization of the invention in its different embodiments.

The invention claimed is:

1. Method for the chip-removing generation or machining of internal gear teeth (22) on a workpiece (20) which is rotatable about its rotary axis (C) and radially delimits a free space (40) that extends axially to one side beyond the internally toothed region and whose radial width narrows in the direction of its axial extension in at least one location, characterized in that
to carry out said method, an externally toothed tool (50) which is driven in rotary movement about its axis of rotation (B) is brought from the opposite side into rolling engagement with the internally toothed region with the rotary axes crossed at an angle and that, through the application of a mechanical force, the chips which are produced in the process and which are subject to a centrifugal force are caused to change their movement in the zone of narrowing width in a manner directed against the origin of the centrifugal force.

2. Method according to claim 1, wherein the change of movement comprises a decrease of the azimuthal velocity component of the chips.

3. Method according to claim 1, wherein the change of movement gives rise to a radially inward directed velocity component of the chips.

4. Method according to claim 1 wherein the application of the mechanical force occurs as a result of the chips colliding with a collision partner (30, 36) of greater mass which is not participating in the rotation.

5. Method according to claim 1 wherein the narrowing of the width occurs in the form of a step (28).

6. Method according to claim 1 wherein the radial width of the free space (46) increases ahead of the location of narrowing width and at an axial distance from the latter.

7. Method according to claim 1 wherein the collision partner (30, 36) is positioned radially close to the spatial boundary of the free space and free of any contact with the workpiece.

8. Method according to claim 1 wherein the collision partner (30, 36) is positioned axially close to the location of narrowing width, but free of any contact with the workpiece.

9. Method according to claim 6 wherein the collision partner is positioned close to the location of increasing width, but free of any contact with the workpiece.

10. Method according to claim 1 wherein the collision partner (30, 36) is held in a position to reach through the free space (42) in the zone of the internal gear teeth and the holder device is positioned within said zone, separated by a distance from the tool (50).

11. Method according to claim 1 wherein a stream of fluid is sent through the free space in the direction in which the free space extends.

12. Device (30) for changing the movement of chips produced in a machining process for generating or finishing internal gear teeth of a workpiece, comprising
a neck portion (34) extending axially to reach through a free space that is radially delimited by the internal gear teeth,
a head portion (36) projecting radially at the free end of the neck portion and carrying an impact surface designed for a collision with the chips,
a base portion (32) adjoining the opposite end of the neck portion and designed to couple the motion-changing device (30) to a movable support device which allows a guided movement of the motion-changing device (30) with a first vector component of the movement in the axial direction and a second vector component, independent of the first, in the radial direction.

13. Device according to claim 12, wherein the axial dimension of the head portion conforms at least in part to the contour of the radially delimited free space that extends beyond the internally toothed zone of the workpiece.

14. Device according to claim 12 wherein the impact surface is at least in part inclined relative to the radial direction.

15. Device according to claim 12 comprising a plurality of azimuthally separated head portions which together extend over a total azimuthal range of more than 60°.

16. Device according to claim 12 wherein the one or more head portions are removable and exchangeable.

17. Set of devices according to claim 12 whose respective head portions differ from each other in their axial and/or radial dimensions.

18. Machine tool (100) for generating or finishing internal gear teeth on a workpiece (20) that can be driven in rotary movement about its axis of rotation, comprising an externally toothed tool (50) that can be driven in rotary movement about its axis of rotation and is designed for rolling engagement with the internal gear teeth under a crossing angle of the axes, wherein the machine tool comprises a workpiece spindle (2) onto which the internally toothed workpiece (20) can be clamped, a tool spindle (10) onto which the tool (50) can be clamped, a first linear displacement axis (Z) along which the relative position between the workpiece spindle and the tool spindle can be changed with a directional component running parallel to the rotary axis of the workpiece, a second linear displacement axis (X) along which the distance between the rotary axis of the workpiece and the rotary axis of the tool can be changed, and a rotary axis (A) relative to which the crossing angle between the respective rotary axes of the workpiece and the tool can be changed, characterized by a movable support device (12, 14) by means of which a device (30) for changing the movement of chips produced in a machining process can be moved with a first vector component of the movement parallel to the first linear displacement axis (Z) and with a second vector component that is independent of, and orthogonal to, the first vector component.

19. Machine tool according to claim 18 comprising a control device which is designed to control the machine tool.

* * * * *